United States Patent
Dunna et al.

(10) Patent No.: US 12,267,127 B2
(45) Date of Patent: Apr. 1, 2025

(54) TERMINATION CIRCUIT FOR LOW POWER BACKSCATTER COMMUNICATION

(71) Applicant: The Regents of the University of California, Oakland, CA (US)

(72) Inventors: Manideep Dunna, La Jolla, CA (US); Miao Meng, La Jolla, CA (US); Patrick P. Mercier, La Jolla, CA (US); Dinesh Bharadia, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 490 days.

(21) Appl. No.: 17/666,198

(22) Filed: Feb. 7, 2022

(65) Prior Publication Data

US 2022/0255587 A1    Aug. 11, 2022

Related U.S. Application Data

(60) Provisional application No. 63/146,071, filed on Feb. 5, 2021.

(51) Int. Cl.
*H04B 5/00* (2024.01)
*H04B 5/72* (2024.01)
(Continued)

(52) U.S. Cl.
CPC .......... *H04B 5/77* (2024.01); *H04B 5/72* (2024.01); *H04B 5/79* (2024.01); *H04W 52/0203* (2013.01); *H04B 7/0413* (2013.01)

(58) Field of Classification Search
CPC ... H04W 28/04; H04W 72/04; H04W 72/042; H04W 88/08; H04B 5/77; H04B 5/72;
(Continued)

(56) References Cited

U.S. PATENT DOCUMENTS 6,596,998 B1 *  7/2003  Siedel ............... G21C 17/108
                                                  250/370.03
6,895,226 B1 *  5/2005  Forster ............. G06K 19/0723
                                                  340/10.33
(Continued)

FOREIGN PATENT DOCUMENTS

WO   WO 2005/002106 A1 *  1/2005  ............... H04K 1/02
WO        2021163480 A1      8/2021

OTHER PUBLICATIONS

FreeRider: Backscatter Communication Using Commodity Radios, Zhang et al., Stanford University, CoNEXT, Dec. 12-15, 2017, Incheon, Republic of Korea. (Year: 2017).*

(Continued)

*Primary Examiner* — Peter G Solinsky
*Assistant Examiner* — Sanjay K Dewan
(74) *Attorney, Agent, or Firm* — Greer, Burns & Crain, Ltd.; Steven P. Fallon

(57) ABSTRACT

Termination circuits for backscatter communication in an integrated wake-up receiver tag device. A reflective termination circuit includes a first branch having an open load and a shorted load with first branch offset reflection coefficients and with a connection to an antenna. A second branch has a capacitive load and an inductive load with second branch offset reflection coefficients and with a connection to an antenna. A MIMO termination circuit includes plurality of transmission lines each providing a unique delay that is offset compared to other ones of the plurality of transmission lines. Switched connections to a corresponding array of antennas introduce a delay between a received and backscattered signal at each antenna in the array of antennas.

22 Claims, 10 Drawing Sheets

(51) Int. Cl.
  *H04B 5/77* (2024.01)
  *H04B 5/79* (2024.01)
  *H04W 52/02* (2009.01)
  *H04B 7/0413* (2017.01)

(58) Field of Classification Search
  CPC ...... H04B 5/79; H04B 7/0413; H04B 5/0062; H04B 5/0031; H04B 5/0037
  USPC .......................................................... 370/329
  See application file for complete search history.

(56) References Cited

U.S. PATENT DOCUMENTS

| | | | |
|---|---|---|---|
| 9,872,252 B1* | 1/2018 | Ang | H04W 76/28 |
| 10,951,446 B2* | 3/2021 | Kellogg | G01S 13/82 |
| 11,637,675 B2* | 4/2023 | Jia | H04L 5/0053 |
| | | | 370/329 |
| 11,637,728 B2* | 4/2023 | Sahin | H04L 5/0048 |
| | | | 370/329 |
| 11,671,297 B2* | 6/2023 | Mazloum | H04L 1/0003 |
| | | | 370/329 |
| 2005/0185749 A1* | 8/2005 | Convent | H03C 3/095 |
| | | | 375/376 |
| 2007/0126585 A1* | 6/2007 | Okunev | G06K 7/10356 |
| | | | 340/572.2 |
| 2009/0102740 A1* | 4/2009 | Rofougaran | H01Q 23/00 |
| | | | 343/860 |
| 2009/0302965 A1* | 12/2009 | Lee | H03K 5/131 |
| | | | 333/2 |
| 2016/0374019 A1* | 12/2016 | Park | H04L 5/0053 |
| 2017/0180166 A1* | 6/2017 | Zhou | H04B 1/525 |
| 2019/0296949 A1* | 9/2019 | Hirose | H04B 1/28 |
| 2020/0007540 A1* | 1/2020 | Kawaguchi | H04B 1/0458 |
| 2022/0141781 A1* | 5/2022 | Gan | H04W 52/0229 |
| | | | 370/329 |
| 2022/0244374 A1* | 8/2022 | Soltanaghaei | G01S 7/356 |
| 2022/0255587 A1* | 8/2022 | Dunna | H04W 52/0203 |

OTHER PUBLICATIONS

Passive Wi-Fi: Bringing Low Power to Wi-Fi Transmissions, Bryce Kellogg et al., University of Washington, 13th USENIX Symposium on Networked Systems, Design and Implementation (NSDI'16), Mar. 16-18, 2016., Santa Clara, CA, USA, ISBN 978-1-931971-29-4. (Year: 2016).*

Wi-Fi Backscatter: Internet Connectivity for RF-Powered Devices, Bryce Kellogg et al., University Of Washington, ACM SIGCOMM Computer Communication Review, 2014, pp. 607-618, vol. 44, No. 4, Association for Computing Machinery. (Year: 2014).*

Hitch Hike: Practical Backscatter Using Commodity WiFi, Pengyu Zhang et al., Stanford University, SenSys'16: Proceedings of the 14th ACM Conference on Embedded Network Sensor Systems, 2016, pp. 259-271, Association For Computing Machinery. (Year: 2016).*

Shirane et al., "A 5.8GHz RF-Powered Transceiver with a 113μW 32-QAM Transmitter Employing the IF-based Quadrature Backscattering Technique", 2015 IEEE International Solid-State Circuits Conference—(ISSCC) Digest of Technical Papers, 2015, pp. 1-3, IEEE.

Kellogg et al., "Wi-Fi Backscatter: Internet Connectivity for RF-Powered Devices", ACM SIGCOMM Computer Communication Review, 2014, pp. 607-618, vol. 44, No. 4, Association for Computing Machinery.

Zhang et al., "FreeRider: Backscatter Communication Using Commodity Radios", CoNEXT '17: Proceedings of the 13th International Conference on Emerging Networking Experiments and Technologies, 2017, pp. 389-401, Association for Computing Machinery.

Zhang et al., "HitchHike: Practical Backscatter Using Commodity WiFi", SenSys '16: Proceedings of the 14th ACM Conference on Embedded Network Sensor Systems, 2016, pp. 259-271, Association for Computing Machinery.

Kellogg et al., "Passive Wi-Fi: Bringing Low Power to Wi-Fi Transmissions", Proceedings of the 13th USENIX Symposium on Networked Systems Design and Implementation (NSDI '16), 2016, pp. 151-164, USENIX Association.

* cited by examiner

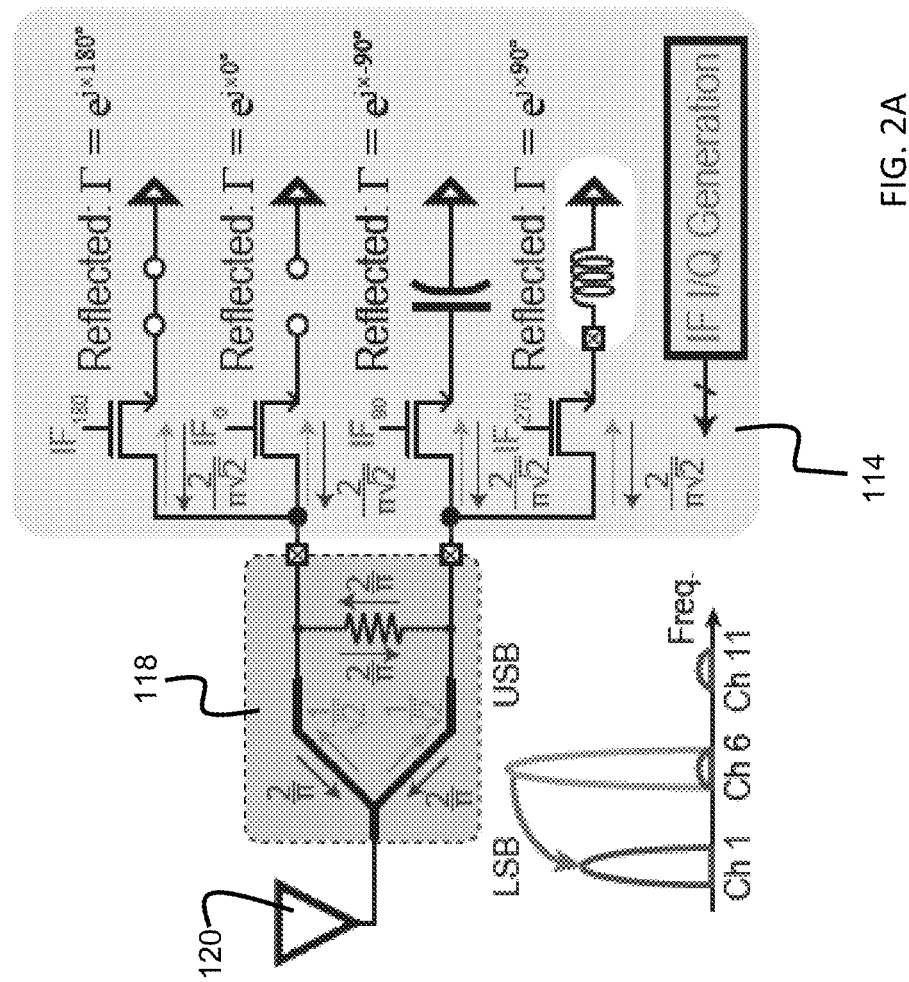
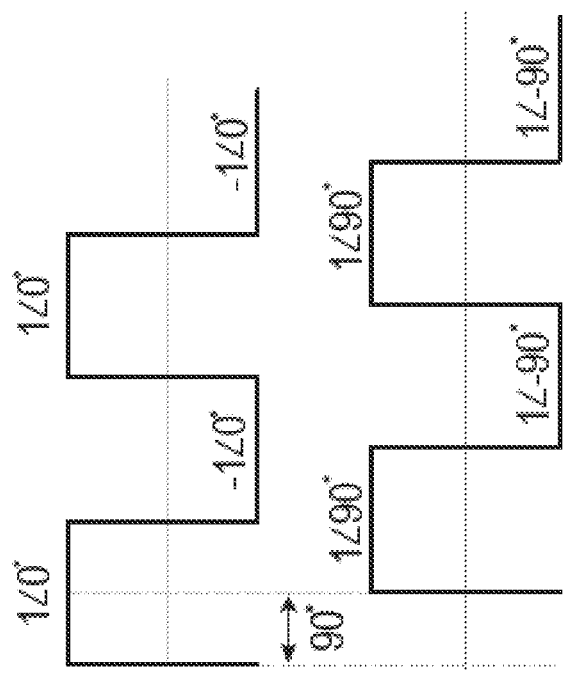
FIG. 2A
FIG. 2B

TERMINATION CIRCUIT FOR LOW POWER BACKSCATTER COMMUNICATION

PRIORITY CLAIM AND REFERENCE TO RELATED APPLICATION

The application claims priority under 35 U.S.C. § 119 and all applicable statutes and treaties from prior U.S. provisional application Ser. No. 63/146,071 which was filed Feb. 5, 2021.

STATEMENT OF GOVERNMENT INTEREST

This invention was made with government support grant number 1923902 awarded by National Science Foundation. The government has certain rights in the invention.

FIELD

A field of the invention includes wireless communications, such as BLE and WiFi, including communications with commodity Wi-Fi transceivers, and low-power wake-up of wireless receivers via Wi-Fi.

Table of Acronyms

The following table defines acronyms/abbreviations used in the following description:
AP Access Point
ASK Amplitude Shift Keying
BLE Bluetooth Low Energy
BPSK Binary Phase Shift Keying
Bps Bits Per Second
CW Continuous Wave
CSI Channel State Information
CMOS Complementary Metal Oxide Semiconductor
DIFS Distributed Interframe Space
dBi Antenna Gain
dBm Decibel Milliwatts
ED Envelope Detector
GHz Gigahertz
IC Integrated Circuit
IF Intermediate Frequency
IoT Internet of Things
IRR Image Rejection Ratio
IQ In Phase and Quadrature
LNA Low-Noise Amplifier
LO Local Oscillator
LSB Lower Sideband
Mbps Megabits Per Second
MUX Multiplexer
MIMO Multiple Input Multiple Output
NFC Near Field Communications
NMOS N Channel MOSFET
OOK On Off Keying
PA Power Amplifier
PLL Phase Locked Loop
PSK Phase Shift Keying
QPSK Quadrature Phase Shift Keying
RF Radio Frequency
RFID Radio Frequency Identification
RSSI Received Signal Strength Indicator
RX Receiver
SSB Single Sideband
TRX Transceiver
TX Transmitter
USB Upper Sideband
VBS Body-to-Source Substrate Bias
VCO Voltage Controlled Oscillator
Wi-Fi Wireless Compatible with the Wi-Fi Alliance
WuRX Wake Up Receiver
XOR Exclusive OR function
XTAL Crystal

BACKGROUND

Wi-Fi is the only pervasive wireless network infrastructure in place today.

This is why most IoT devices must connect to the internet via Wi-Fi. A problem is that conventional Wi-Fi transceivers have power demands that conflict with the very low power ideal of IoT devices. Conventional Wi-Fi transceivers require 10s to 100s of mW of active power from RF blocks such as LNAs, LO frequency generation and stabilization, and power amplifiers (PAs), in part due to strict performance demands imposed by the IEEE 802.11-based standards. As a result, nearly all current Wi-Fi compatible IoT devices require either wall power, or large and/or frequently re-charged batteries.

While other standards with lower standards-based performance requirements, such as BLE, may achieve very low average power (<<1 mW) via duty-cycling at the expense of throughput and latency, very small coin cell batteries or energy harvesters still cannot be used due to relatively high peak power requirements (e.g., a few mW for BLE). More importantly, standards such as BLE do not have widely distributed infrastructure in most homes, offices, or other environments, which makes rapid low-cost deployment difficult.

To enable a new class of miniaturized, battery-powered or energy-harvested IoT devices, backscatter communication, where an incident RF source is reflected via a low-power impedance modulating tag, has been proposed [1]. However, most current solutions rely on custom tone generators [1,2], and thus cannot be rapidly deployed at scale with low cost. To enable operation with existing infrastructure, recent work has shown that already-pervasive Wi-Fi signals can be used as incident RF sources for backscattering, and through techniques such as codeword translation, commodity Wi-Fi RXs can be used to receive backscattered data [3,4]. However, the demonstrated technique required a Wi-Fi RF source (such as a smartphone) within 6 m of the tag, and two separate Wi-Fi readers within 8 m.

Perhaps the most popular technologies leveraging backscatter communications today are NFC and RFID tags. NFC tags are widely used in applications such as contactless payment systems and electronic keycards, use near-field inductive coupling between two coils to transmit data, which limits the operating range to within approximately 10 cm of the source. For this reason, NFC is not well suited for most IoT applications. However, because of its inductive coupling mechanism, NFC tags normally operate at 13.56 MHz and are resilient to RF interference. RFID tags, which can be widely seen in applications such as highway electronic toll system and inventory management system, use far-field radiative coupling for transmission. RFID tags normally operate at 0.4-2.4 GHz, and meters of communication range are achievable. RFID tags are suitable for IoT devices in terms of range and power. However, the conventional RFID tags have limitations that are less than ideal for IoT device applications.

One limitation concerns spectral efficiency. Conventional RFID tags receive a CW signal and reflect it with data modulation limited to ASK or OOK only. These techniques are not spectrally efficient.

Another limitation concerns interference resiliency. Because the downlink incident wave is a CW signal, and the uplink reflected wave is an ASK/OOK signal, RFID tags are very susceptible to RF interference. To solve this issue, normally the direction and location of the CW source (e.g., RFID readers) are optimized, for example, inside a warehouse using an RFID inventory management system. This is not practical for mass IoT devices coexistence at home or in urban areas.

An additional limitation concerns compatibility with existing standards and low-cost deployment. To generate a CW incident wave and be able to demodulate the reflected signal, a dedicated RFID reader hardware is required. However, this approach contradicts the target of cost-effective direct deployment that leverages well-established standards such as Wi-Fi.

Backscatter Wi-Fi has been proposed. However, none of the proposed techniques meets the need of using only commodity Wi-Fi hardware with a low-power backscattering integrated circuit, good sensitivity and high data rates.

One proposed Wi-Fi compatible solution is called Wi-Fi Backscatter [5]. A Wi-Fi access point (AP) transmits the signal to both the tag and the receiving Wi-Fi station, while the tag modulates the channel RSSI by absorbing and backscattering the signal alternately with the tag's data. This ASK-modulated signal (modulated in terms of RSSI) can be demodulated by the receiving Wi-Fi station via checking the CSI or RSSI, which are normally provided in state-of-the-art Wi-Fi chipsets. This is a good hardware approach, but the approach uses the entire Wi-Fi packet as a single bit, and therefore achieves very low data rate (100 s of bps). Moreover, the inherent lower sensitivity RSSI receiver from the standard chips along with ambient noise in the implemented system limited the range to only 0.65-2.1 m.

Another solution, called passive Wi-Fi, [2], was designed to improve upon the approach discussed in the previous paragraph. This passive Wi-Fi approach uses a conventional TX architecture to generate an IEEE 802.11b baseband signal directly. Instead of generating the power-hungry RF LO locally, a single tone RF source provides the RF LO outside, and the Wi-Fi compatible packet is synthesized by combining the baseband signal with the incident LO via backscatter modulation through the antenna. Although this method can enable a low power tag, only the uplink is Wi-Fi compatible, while the downlink still requires custom hardware to generate the CW signal.

A solution to this issue called Hitchhike is proposed in [3] and can achieve Wi-Fi compatibility in both the downlink and the uplink. A Wi-Fi signal generated by a mobile phone creates the incident signal received by the IoT tag. The tag performs PSK-based modulation on each symbol of the incident wave, which creates a backscatter signal on a different channel for reception by a Wi-Fi AP2. Meanwhile, the original un-disturbed Wi-Fi transmission from the mobile phone is received by AP1. Thus, AP1 has the original phone data, while AP2 has phone data that has been phase modulated by the IoT tag. By connecting the two APs through the cloud, both data are available to a decoder. This decoder employs a technique called codeword translation to decode the tag's data. Theoretically, there is only the need for one Wi-Fi transmitter and one receiver in this approach. However, the limited range of the downlink wake-up receiver required use of a third device (the mobile phone) to close a reasonable link budget.

Wang et al PCT Published Application WO 2021/163480 describes a method for communicating directly with commodity Wi-Fi transceivers (TRXs) via backscatter modulation in an integrated tag device. Disclosed circuits allow receives to be woken up directly via a Wi-Fi TRX using a 2.8 µW wake-up receiver with −42.5 dBm sensitivity-good enough for >30 m wake-up range, and backscatters to a frequency-translated Wi-Fi channel via an on-chip 28 µW single-side-band QPSK modulator. Wireless tests revealed a range of 21 m between Wi-Fi access points. The transceivers in the '480 Publication use a power combiner to sum backscattered signals into an omnidirectional antenna. The inventors have realized that the present termination in the '480 Publication includes resistance in addition to backscatter switches, which absorb some power and reduce the average reflected power. The antenna also provides omnidirectional re-radiation, which reduces the power seen by a device receiving a backscattered signal from the transceiver.

REFERENCES

[1] A. Shirane et. al., "A 5.8 GHz RF-Powered Transceiver with a 113 µW 32-QAM Transmitter Employing the IF-based Quadrature Backscattering Technique" in Proc. ISSCC Technical Digest, 2015.
[2] JB. Kellogg et al., "Passive Wi-Fi: bringing low power to Wi-Fi transmissions," in Proc. of the Conference on Networked Systems Design and Implementation, pp. 151-164, 2016.
[3] P. Zhang et al., "HitchHike: Practical Backscatter Using Commodity Wi-Fi," In Proc. of the ACM Conference on Embedded Network Sensor Systems, pp. 259-271, 2016.
[4] P. Zhang et al., "FreeRider: Backscatter Communication Using Commodity Radios," In Proc. of the International Conference on Emerging Networking EXperiments and Technologies (CoNEXT '17), pp. 389-401. 2017.
[5] B. Kellogg, A. Parks, S. Gollakota, J. R. Smith, and D. Wetherall, "Wi-Fi Backscatter: Internet connectivity for RF-powered devices," in Proc. ACM Conf. SIGCOMM, August 2014, pp. 607-618.

SUMMARY OF THE INVENTION

A preferred embodiment provides a termination circuit for backscatter communication in an integrated wake-up receiver tag device. The circuit is a reflection termination circuit. The termination circuit includes a first branch having an open load and a shorted load with first branch offset reflection coefficients and with a connection to an antenna. A second branch has a capacitive load and an inductive load with second branch offset reflection coefficients and with a connection to an antenna. Preferably, the first and second branch offset reflection coefficients provide four unique phase shifts.

A preferred termination circuit for backscatter communication in an integrated wake-up receiver tag device is a MIMO (multiple input multiple output) termination circuit. The termination circuit includes a plurality of transmission lines each providing a unique delay that is offset compared to other ones of the plurality of transmission lines. Switched connections to a corresponding array of antennas introduce a delay between a received and backscattered signal at each antenna in the array of antennas.

BRIEF DESCRIPTION OF THE DRAWINGS

FIG. 2A illustrates the reflective termination of the FIG. 1A transceiver circuit;

FIG. 2B the received and backscattered fully reflected signal representation of at the reflective termination of FIG. 1A transceiver circuit;

DETAILED DESCRIPTION OF THE PREFERRED EMBODIMENTS

Preferred embodiments provide Wi-Fi-compatible backscatter-based communication. Preferred embodiments provide an IC design for backscatter communication with an integrated wake-up receiver that is compatible with the 802.11 standard Wi-Fi access points. The chip piggybacks on the RF signals existing in the environment to encode data onto them which can be decoded by the Wi-Fi receivers or access points. Preferred embodiments include multiple antennas (MIMO) at the backscatter tag to improve the range of backscatter communication. MIMO antennas are preferably implemented in a Van Atta Array configuration to retroreflect the signals to increase the range. The fabricated chip improves the range of Wi-Fi backscatter communication to ~24 meters in a retroreflective configuration. The prior art such as Hitchhike is limited to 10 m AP to Tag separation. Another preferred embodiment includes a fully reflective termination.

A preferred termination circuit for backscatter communication in an integrated wake-up receiver tag device is a reflection termination circuit. The termination circuit includes a first branch having an open load and a shorted load with first branch offset reflection coefficients and with a connection to an antenna via a power splitter combiner. A second branch has a capacitive load and an inductive load with second branch offset reflection coefficients and with a connection to the antenna via the power splitter combiner. Preferably, the first and second branch offset reflection coefficients provide four unique phase shifts.

A preferred termination circuit for backscatter communication in an integrated wake-up receiver tag device is a MIMO termination circuit. The termination circuit includes plurality of transmission lines each providing a unique delay that is offset compared to other ones of the plurality of transmission lines. Switched connections to a corresponding array of antennas introduce a delay between a received and backscattered signal at each antenna in the array of antennas.

Preferred embodiments of the invention will now be discussed with respect to experiments and drawings. Broader aspects of the invention will be understood by artisans in view of the general knowledge in the art and the description of the experiments that follows.

Figure 1A:
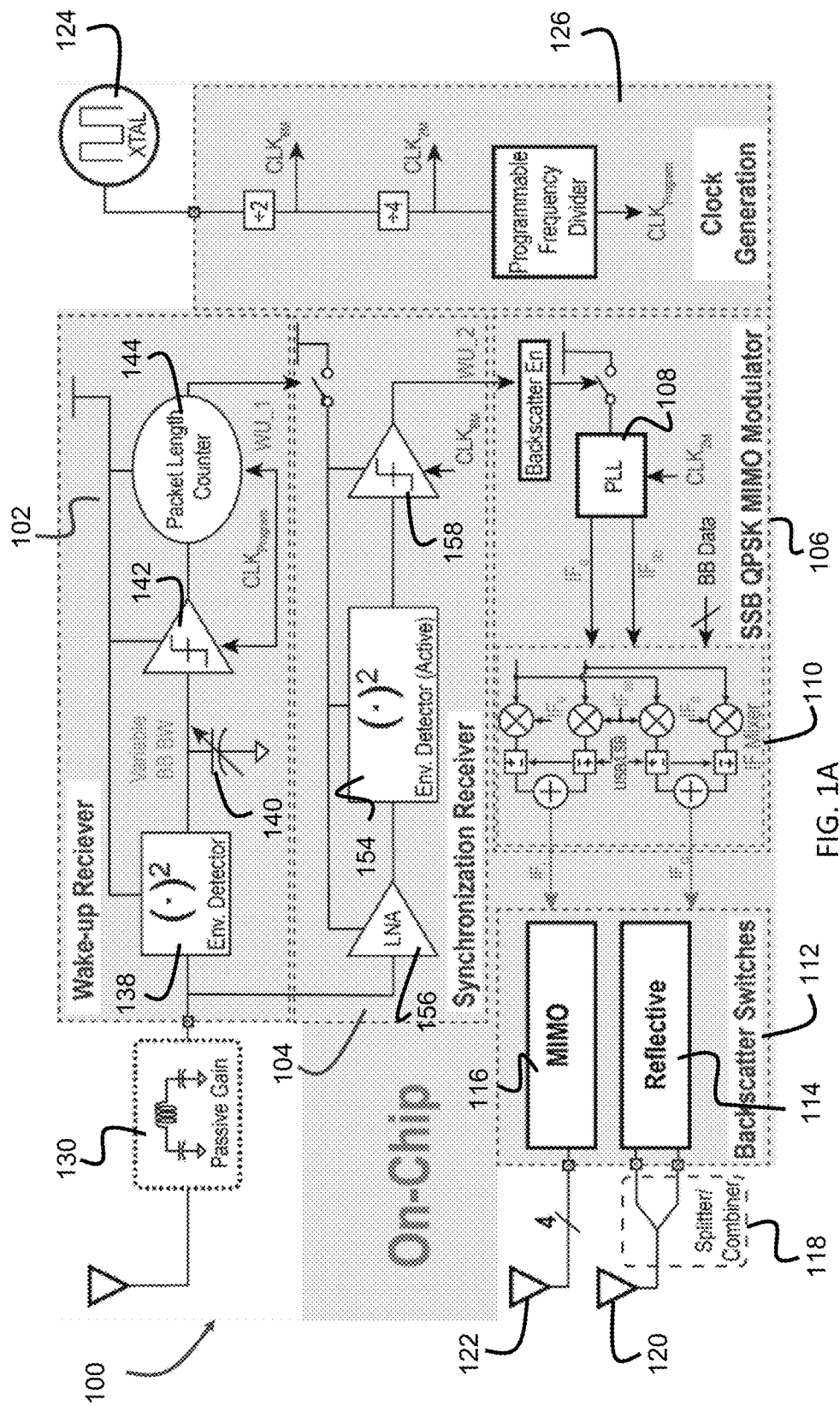
FIG. 1A is a block diagram a preferred backscatter modulator wake-up transceiver integrated circuit.
Figure 1B:
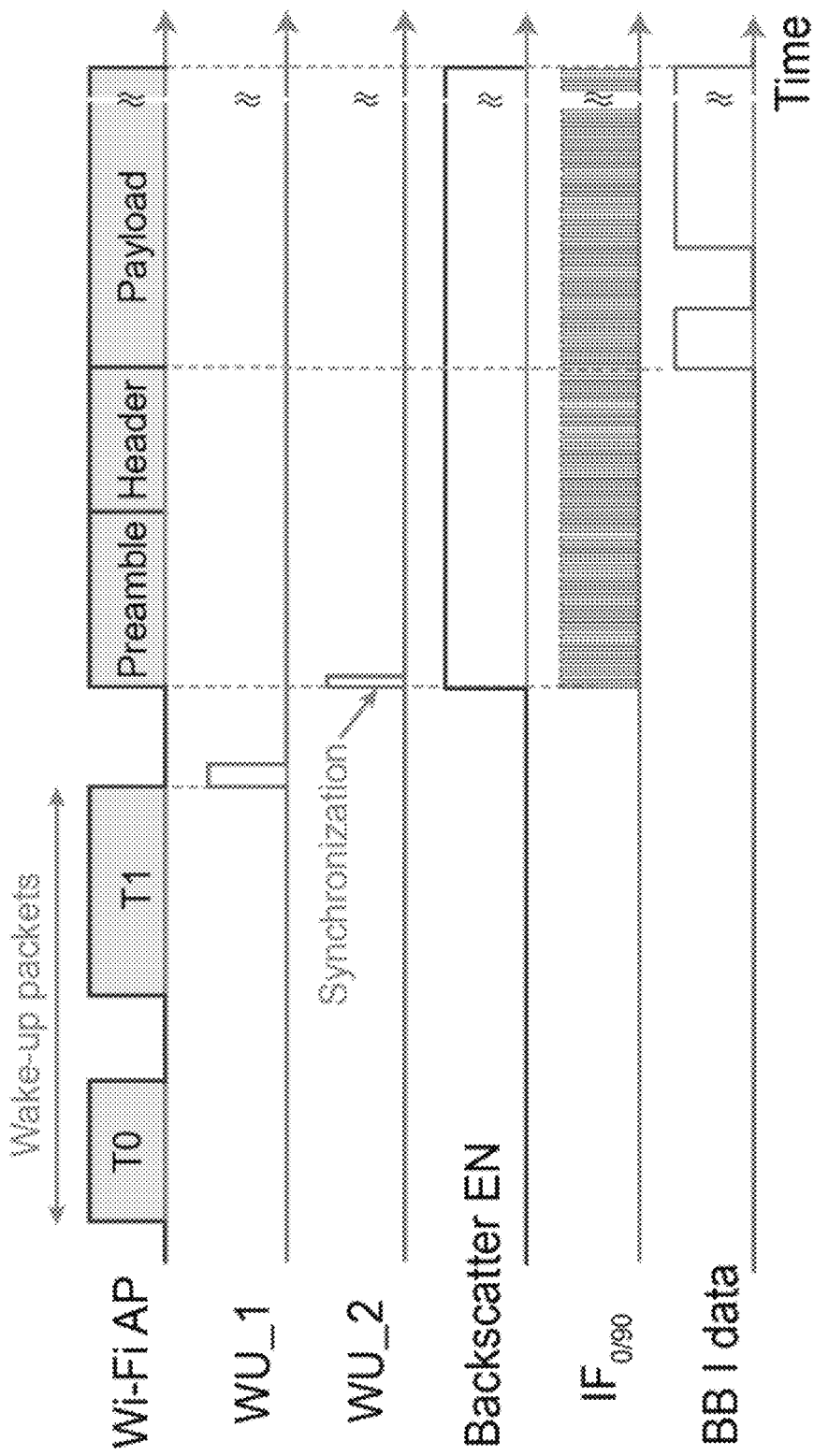
FIG. 1B is a signal diagram showing wake-up, synchronization and backscatter timing of the FIG. 1A circuit.

FIGS. 1A and 1B illustrate a preferred embodiment backscatter transceiver integrated circuit 100 that can function in a backscatter tag device. The transceiver circuit 100 includes a wake-up receiver 102 implemented with an energy-detection based architecture for low standby power, and has a counter-based scheme for robust wake-up with fully WiFi compatible packets. A synchronization receiver 104 is triggered by the wake-up receiver 102 to improve the synchronization accuracy to below 150 ns. A SSB QPSK modulator 106 is driven by a PLL 108 to provide control signals for the backscatter switches via an IF mixer 110. A backscatter switching section 112 includes fully-reflective 114 and retro-reflective MIMO 116 circuits. This reflects a test chip, and a commercial implementation needs only one of the fully-reflective 114 and retro-reflective MIMO 116 circuits. The fully-reflective circuit 114 connects to a splitter/combiner 118 and an antenna array 120, while the retro-reflective MIMO circuit 116 connects to an antenna array 122. The antenna arrays 120 and 122 should have four antennae as a minimum for single-side band modulation. More antennae can be used, e.g. by replicating a first set of four antennae. A crystal oscillator 124 with divider logic 126 that provides global frequency generation for the transceiver integrated circuit 100.

FIG. 1B illustrates timing for wake-up and communication using the FIG. 1 transceiver circuit 100. For the downlink, the transmitting WiFi AP initiates two pre-specified WiFi packets, shown as Packets T0 and T1. The time between the two packet is not necessarily known and can have other intervening packets from other APs in crowded network due to the competing nature of WiFi communication. After detection of T0, the tag will open a detection window with pre-determined length and look for the second pre-specified packet T1, successful detection of T1 within the detection window will wake up the tag, even when intervening packets are sensed between T0 and T1. These packets are preferably configured to comply with existing 802.11b protocols, and multi-tag within the same network can be distinguished by assigning different lengths of T0 and T1.

Since RF voltage gain can directly improve the sensitivity of an energy-detection based RX, a matching network 130 (FIG. 1A) can be employed to provide passive RF gain, e.g. 8 dB of gain. The wake-up signal is first amplified and filtered via the network 130 and then an envelope detector (ED) 138 directly demodulates the RF wake-up signal to baseband via its 2nd order nonlinearity while a programmable capacitor 140 is used at the ED output to set the bandwidth for baseband signal filtering. The programmable capacitor 140 provides the ability to adopt different packet length and optimize sensitivity under different wake-up patterns. A fixed capacitor can be used for specific applications, e.g., where packet lengths and sensitivity requirements are determined and then an optical fixed capacitance can be selected. The ED output is then oversampled by a 40 kHz clock and digitized by a two-stage dynamic comparator 142 with a programmable threshold to reduce offset voltage issues and optimize sensitivity. The comparator output is then processed by an counter 144, e.g., and 8-bit counter, to count the packet length with programmable error tolerance to enable robust detection of the pre-specified WiFi signature. An 8-bit counter at 40 kHz is enough to detect packets of duration 6.4 ms which is much higher than the WiFi packet duration in a tested implementation. A counter with more than 8 bits can be implemented if needed.

The wake-up event triggers the synchronization stage 104, which shares the same antenna 150 and matching network as the wake-up RX 102. An active ED 154 with increased conversion gain via a low-noise amplifier 156 that ensures decreased noise is employed in synchronization RX for high bandwidth to enable high synchronization accuracy. The low-noise-amplifier 156 is adopted before the ED 154 to boost the RF gain to ensure the sensitivity while maintaining the high bandwidth. A similar comparator 158 as in the wake-up RX with tunable reference voltage is used after the active ED 154. The comparator is sampled with an 8 MHz sampling clock to meet the timing accuracy requirements. The synchronization RX 104 is tuned on until the rising edge of data packet. The synchronization RX 104 is turned off after successful detection of the data packet to save power (average of 50 µs in an example implementation).

After synchronization, the tag transceiver 100 first backscatters the 192 µs packet header (with frequency translation) to receiving AP2 without any phase alteration to ensure correct reception by AP2. After the header, the payload data is modulated by the tag data and then backscattered to AP2. Finally, AP1 and AP2 recover the tag data in cloud by a codeword translation method that is described in P. P. Wang, C. Zhang, H. Yang, M. Dunna, D. Bharadia, and P. P. Mercier, "A Low-Power Backscatter Modulation System Communicating Across Tens of Meters With Standards-Compliant Wi-Fi Transceivers" in IEEE Journal of Solid-State Circuits, vol. 55, no. 11, pp. 2959-2969, November 2020.

FIG. 2A illustrates the reflective termination 114 of FIG. 1A, and FIG. 2B the received and backscattered fully reflected signal representation. With the fully reflective termination 114, the top branch includes both open load and shorted loads, which have reflection coefficients of 1/0° and 1/180°, respectively. For this case, the reflected signal in the top branch increases by a factor of 2 and is equal to $2[\sin(2\pi f_c t)*S_t]$. Similarly, the bottom branch is modified to have a capacitive and inductive load with reflection coefficients of 1/270° and 1/90°. The reflected signal in the bottom branch also increases by a factor of 2 and is equal to $2[\sin(2\pi f_c t)*S_b]$. $S_t$ and $S_b$ are square waveforms of frequency f that have 90-degree phase offset. The total reflected signal rp1(t) is:

$$r_{p1}(t) = \frac{1}{\sqrt{2}}\left[\frac{1}{\sqrt{2}}\sin(2\pi f_c t) * \frac{4}{\pi}\sin(2\pi f t) - \frac{1}{\sqrt{2}}\cos(2\pi f_c t) * \frac{4}{\pi}\cos(2\pi f t) = \right. \quad (1)$$

$$\frac{2}{\pi}\left[\sin(2\pi f_c t)\sin(2\pi f t) - \cos(2\pi f_c t)\cos(2\pi f t) = \right.$$

$$\frac{2}{\pi}[\cos(2\pi(f_c + f)t + \pi)]$$

This improves by 2 time the single amplitude compared to Wang et al PCT Published Application WO 2021/136480. This provides a 6 dB improvement in backscattered signal power and 3.94 dB insertion loss. The backscattered signal of the present approach contains only the frequency $f_c+f$, while also providing improved insertion loss. In FIG. 2A, the open branch has ideally infinite resistance while short has ideally zero. The capacitor preferably provides an ideal −90 degrees phase shift at 2.4 GHz, e.g., with 1.2 pF in an example implementation, and the inductor provides an ideal 90 degrees phase shift, e.g., with 3.3 nH in an example implementation.

Figure 3:
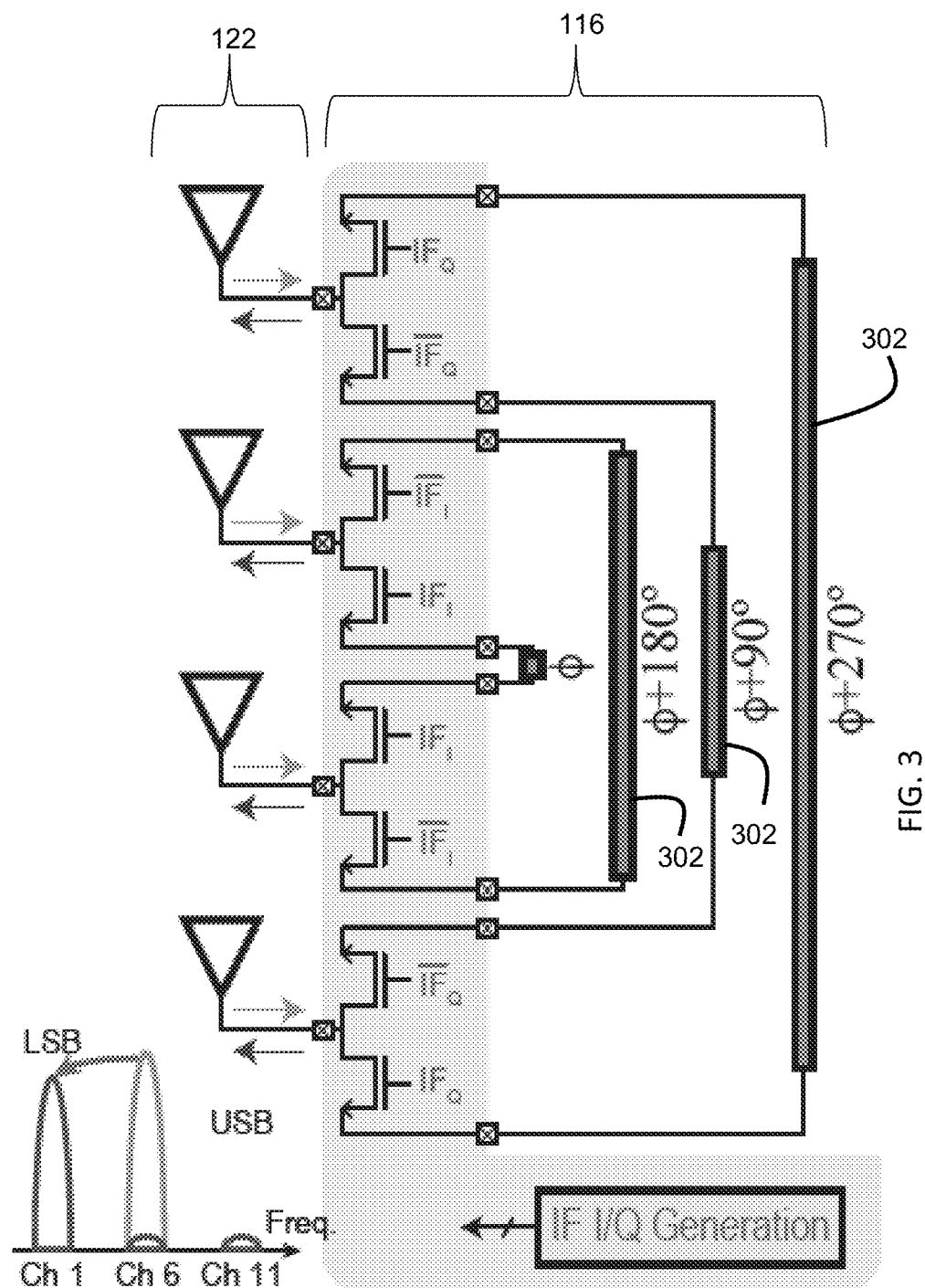
FIG. 3 illustrates the MIMO circuit and an antenna array of the FIG. 1A transceiver circuit.

FIG. 3 illustrates the MIMO circuit 116 and an antenna array 122 of the FIG. 1A transceiver. MIMO conventionally requires multiple precision local oscillators with finely tuned phase delays to enable beam steering, which is completely impractical in a low-power IoT (Internet of things device) tag. The circuit of FIG. 3 avoids such impracticality with a Van Atta retro-reflector that reflects incident waves back to their source in a fully passive manner. This circuit eliminates the need for a power splitter and enables a self-steered beam with directional gain, thereby significantly extending the range. The MIMO circuit 11 includes a plurality of transmission lines 302.

By properly selecting the delay through the transmission lines 302 connecting each antenna of the array 122, incident RF signals at angle θ will be re-radiated in a steered beam back at the same angle. Simply alternating between the re-radiation condition and a 50Ω terminated condition at the BaseBand (BB) data rate could enable OOK backscatter, while mixing the BB with an IF clock could PSK backscatter at frequency-shifted channels. However, the generated double-sideband (DSB) signal undesirably occupies all three WiFi channels, and the periodically-absorbing condition reduces the amount of re-radiated power. To overcome these challenges, the FIG. 3 circuit is a Q-modulated Van Atta structure, where 90° and 180° transmission-line (TRL)-based delays are intentionally added between antennas to enable QPSK SSB reflections. The outer two antennas are connected by a switched pair of 270° and 90° TRLs and modulated by a Q-phase IF signal, similar to the fully-reflective approach of FIG. 2A when terminated with open load and capacitor, the reflective signal for each antenna is equal to $2[\sin(2\pi f_c t)*S_t]$. However, a pair of antennae are used instead of a single antenna, so the total combined reflected signal at the RX location is equal to $4[\sin(2\pi f_c t)*S_t]$. The inner two antennae are connected by a switched pair of 0° and 180° TRLs (i.e., 90° separated from the outer antennae) and driven by the I-phase IF signal, similarly, the combined signal from this pair at RX location is equal to $4[\sin(2\pi f_c t)*S_b]$. The absolute value of the delay introduced by each transmission line can be changed, as long as there is a relative difference in delay between each line relative to the other lines. Also, while four antennas are shown with four transmission lines in FIG. 3, additional antennas and transmission lines can be added while maintaining a relative delay offset between each transmission lines and the other lines. In addition, since the lossy Wilkinson power combiner and splitter 118 is not needed, the two $$\frac{1}{\sqrt{2}}$$

factors from Eq (1) are eliminated. Therefore, the total combined reflected signal rp2(t) for the proposed MIMO approach is:

$$r_{p2}(t) = \left[\sin(2\pi f_c t) * \frac{8}{\pi}\sin(2\pi f t) - \cos(2\pi f_c t) * \frac{8}{\pi}\cos(2\pi f t) = \right. \quad (2)$$

$$\frac{8}{\pi}\left[\sin(2\pi f_c t)\sin(2\pi f t) - \cos(2\pi f_c t)\cos(2\pi f t) = \right.$$

$$\frac{8}{\pi}[\cos(2\pi(f_c + f)t + \pi)]$$

This provides a signal amplitude increase of additional four times more than the fully reflective circuit 114, an improvement over Wang et al PCT Published Application WO 2021/136480 of 18.06 dB and an improvement over the fully reflective circuit of 12.04 dB. As an example variation to FIG. 3 connections, Inner(0 and 180 degree) and outer pairs (90 and 270 degree) of transmission lines can be exchanged to change the side-band from Right side to left side. For example, in FIG. 3, the side-band (right/left) is being controlled by IF_I and IF_Q clocks, by either making IF_Q leading the IF_I by 90 degree or IF_Q lagging the IF_I clocks by 90 degree. If the inner and outer pair of transmission lines are interchanged, the IF_I, IF_Q setting that would have given rise to right side band will result in left-side band had the pairs not been interchanged. Similarly, the IF_I and IF_Q setting that would have given rise to left side band will result in right side band had the pairs not been interchanged.

Figure 4:
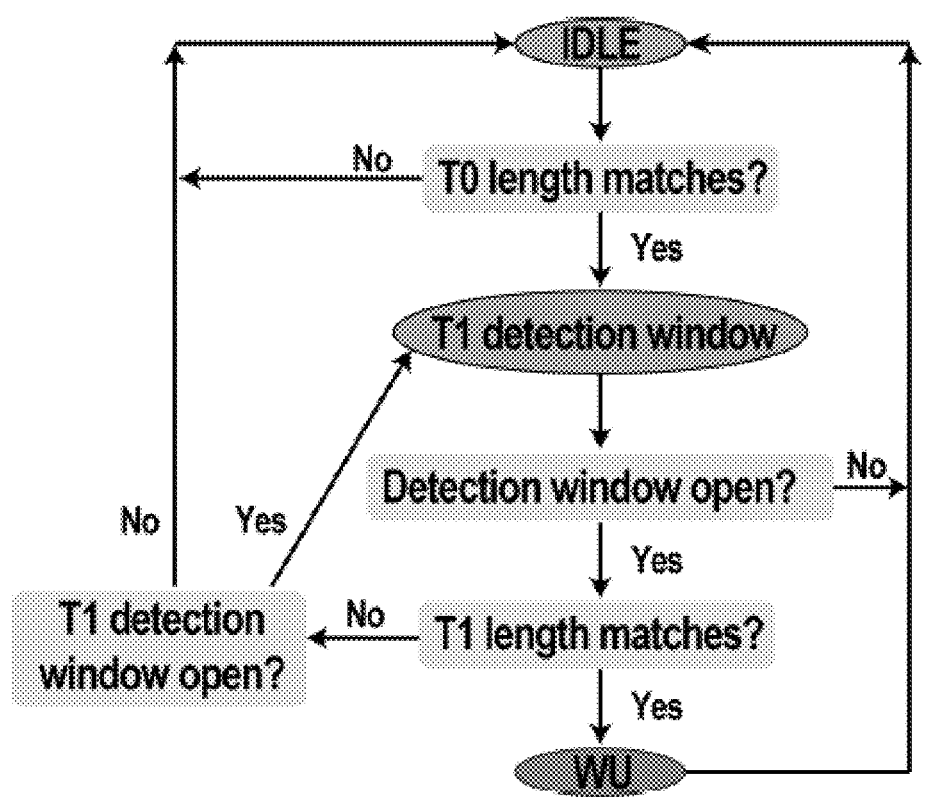
FIG. 4 shows a state diagram of a preferred wake-up scheme for the transceiver of FIG. 1A.

The present invention also provides a new counter-based wake-up scheme as compared to Wang et al PCT Published Application WO 2021/136480. FIG. 4 shows a state diagram of a preferred wake-up scheme for the transceiver of FIG. 1A. With reference to FIG. 4, the wake-up scheme uses a counter to measure the length of two pre-specified WiFi compatible packets lengths. The counter measures the length of the first packet T0, a detection window with programmable opening time is initiated if length of T0 matched the pre-specified length. If the second correct packet T1 is received within the detection window, the transceiver tag is waked. The wake-up RX continuously looks for T1 until it is the received, or detection window is closed. The wake-up scheme allows robust wake up based on the lengths of T0 and T1 despite of the uncertain interframe space time in between, even in crowded networks. In addition, the scheme supports multi-tag communication by assigning different combinations of T0 and T1 lengths.

The sensitivity of a direct ED receiver is given by:

$$P_{sensitivity} = \frac{20}{k_{ED} * A_v^2} \sqrt{BW_{BB} * PSD_0 * SNR_{MIN}} \quad (3)$$

where $k_{ED}$ is the scaling factor of the envelope detector, $A_v$ is the font-end voltage gain, $PSD_0$ is the output-referred baseband noise, and $SNR_{MIN}$ is the required minimum signal-to-noise ratio. Assume the baseband is sampled at the Nyquist rate, this means a baseband bandwidth of at least 6.7 MHz is needed to achieve synchronization accuracy of 150 ns. However, with such bandwidth, it is impossible to achieve a sensitivity of −35 dBm. Adding RF gain is the most efficient or the only way to improve the sensitivity, which is typically undesired due to the high power consumption since the wake-up receiver is always turned on.

Figure 5:
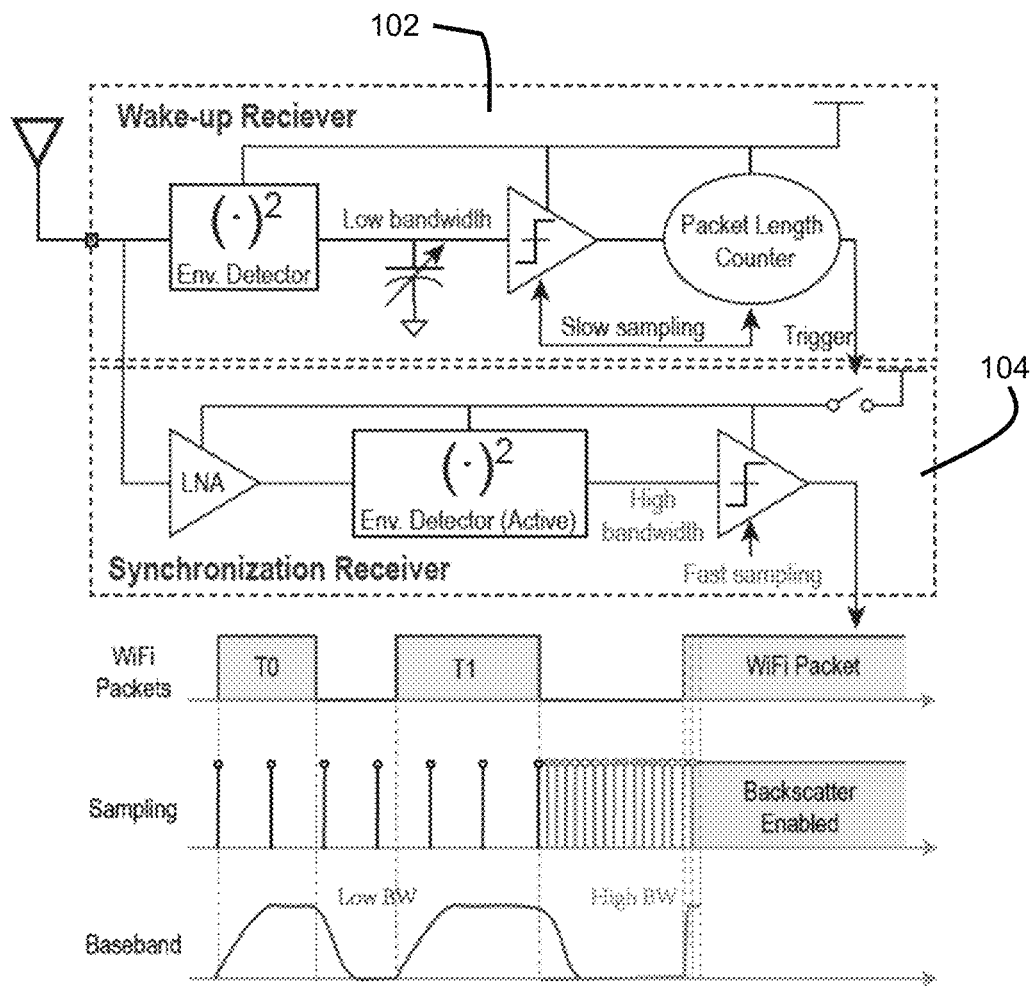
FIG. 5 illustrates a preferred hierarchical wake-up scheme for the FIG. 1A transceiver circuit.

A transceiver of the invention instead relies upon a hierarchical wake-up scheme, which is shown in FIG. 5. With this timing only the wake-up RX 102 is always on, the power-hungry synchronization RX 104 is deeply duty-cycled. The low-power wake-up RX 102 has low bandwidth and implemented to trigger the synchronization RX 104. When wake-up packets are detected, synchronization RX 104 is turned on for a short period of time, operating with high bandwidth to detect the rising edge of the data packet. Once the beginning of the data packet is detected, synchronization RX 104 goes back to sleep mode to save power. Single digit μW average power can be achieved with the FIG. 5 hierarchical wake-up.

Figure 6A:
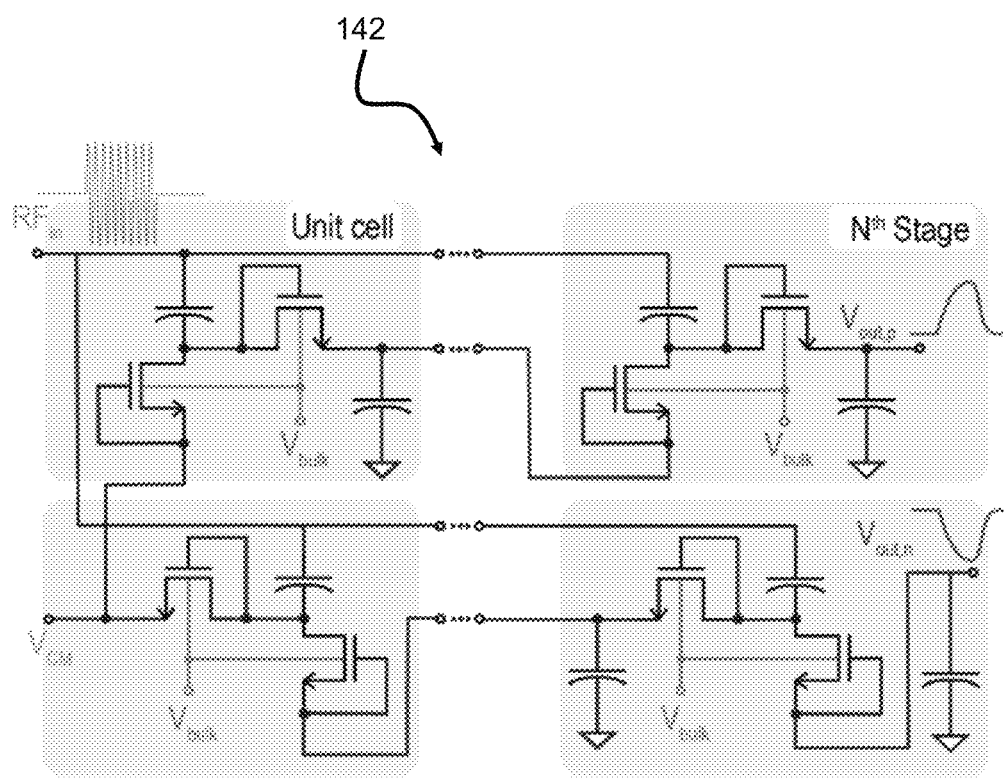
FIGS. 6A-6D show preferred circuit implementations respectively for the passive envelope detector in the wake-up receiver, the low-noise amplifier and active envelope detector in the synchronization receiver, an integer-N phase-locked loop (PLL) in the modulator, and the IF mixer (in block diagram form).

FIGS. 6A-6D show preferred circuit implementations. FIG. 6A shows the shows the passive pseudo-balun ED 142 of FIG. 1A. The ED 142 provides large input resistance to not degrade the passive voltage gain of the matching network 130, while provides sufficient output bandwidth for the baseband signal (200 kHz in this case) for sharp rising and falling time. It demodulates a single-ended input RF signal to differential output signal thanks to the pseudo-differential structure, enabling 2×conversion gain and 1.5 dB of sensitivity improvement under the same output bandwidth compared to its single-ended counterpart.

Figure 6B:
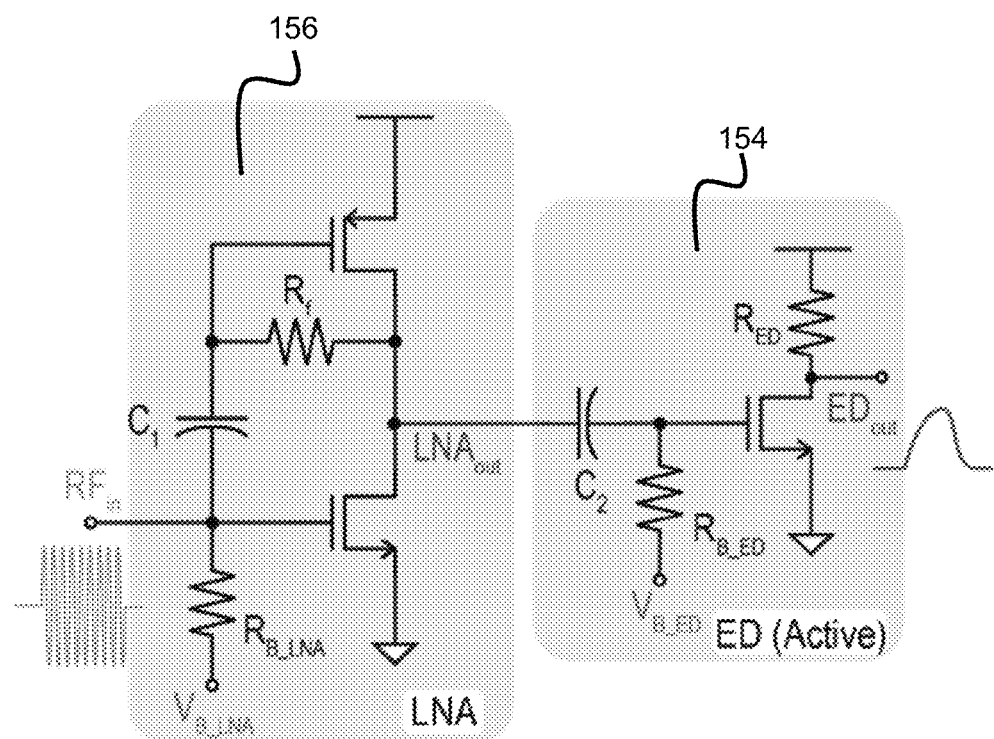

FIG. 6B shows the LNA 156 and active envelope detector 154. A current reuse common source amplifier is implemented to achieve an 11 dB gain with sufficiently low noise to meet the sensitivity requirement for synchronization RX. The output of LNA 156 feeds into the active ED 154. The ED is a common source ED and can be employed with an example bandwidth of 32 MHz to ensure a highly accurate rising edge timing. The ED is optimized via transistor size, resistor size, bias threshold in terms of conversion gain.

Figure 6C:
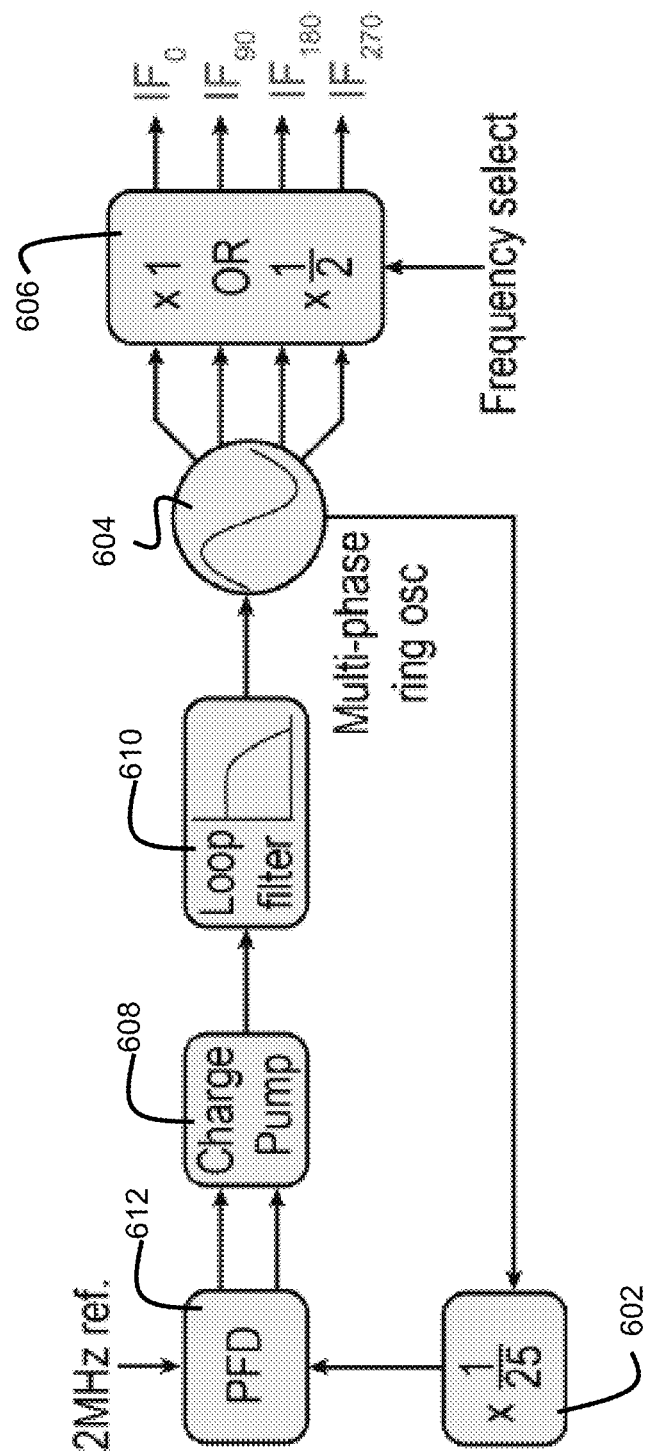

FIG. 6C shows the preferred PLL 108 implementation. A standard type-II integer-N PLL is adopted with a divider 602 having ratio of 25. A 50 MHz IF clock is achieved from a 2 MHz reference clock generated by a crystal oscillator. A voltage controlled oscillator (VCO) 604 can generate, via a frequency selector 606, four clock phases with 90-degree difference for consecutive phases that are provided by the chain of ring oscillator 604. These clocks with four different phases are passed through divider logic 602 to alternate the frequency between 25 or 50 MHz to enable frequency translation from channel 6 to channel 1 or 11, or translation between channels 1 and 11 depending on application needs. The components are generally conventional with a charge pump circuit 608 is connected with a loop filter 610 and a phase frequency detector 612 that receives a reference signal. The charge pump 608 serves as a converter to analog for the logic states of the PFD 612, which signal controls the oscillator 604 via the loop filter such its frequency is controlled by the output signal of the charge pump 608.

Figure 6D:
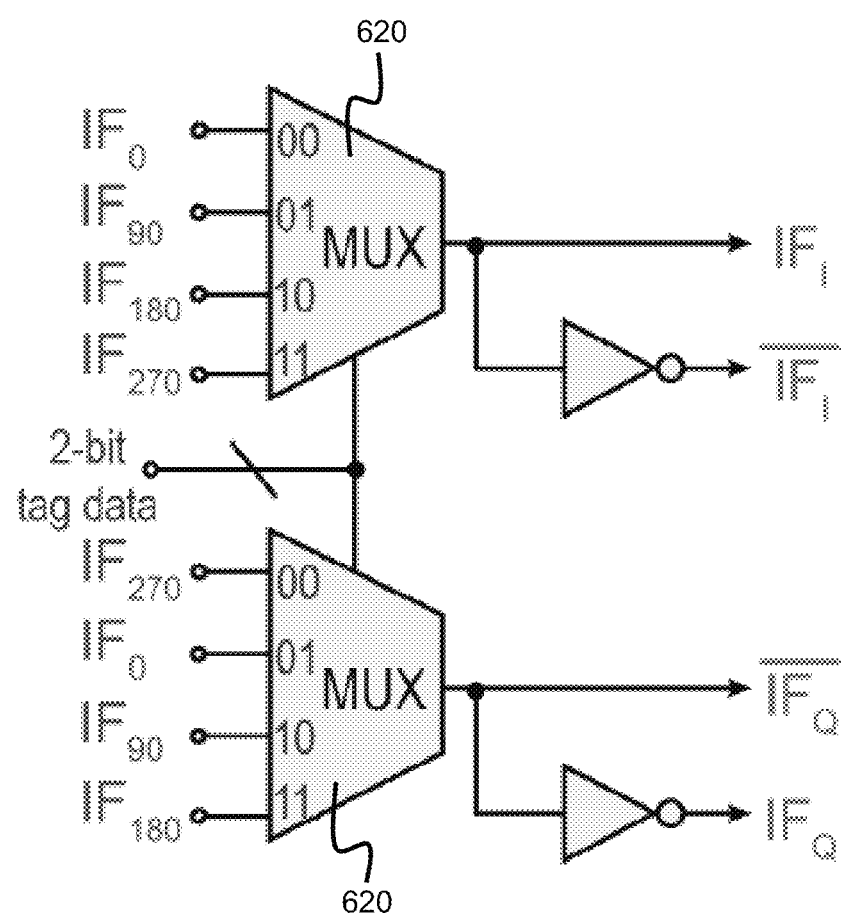

FIG. 6D is a preferred implementation of digital SSB IF mixer 110. Two 4:1 MUX logics 620 with 90-degree rotate IF clock inputs are used. QPSK modulation can be achieved by controlling the MUXs 602 via a 2-bit tag data.

The transceiver of FIG. 1A has been fabricated in a 65 nm process, with an active area of 0.44 mm$^2$. An on-board Wilkinson power combiner was implemented for the reflective termination approach, and for the MIMO approach, transmission lines with specific phase shifts were designed on board to satisfy the requirement to achieve MIMO-based SSB QPSK modulation with four equally separated antennas being connected to the chip through the four transmission lines with equal electrical length.

Testing showed a sensitivity of −43.4 dBm for a missed detection rate of $10^{-3}$, supporting >30 m AP-to-tag wake-up distance. Testing showed at least 150 ns jitter can be achieved for power level of −35 dBm or better. During wake-up mode, the chip consumes 4.5 μW to successfully wake-up to the desired signature, where 1.5 μW from the crystal oscillator, and 3 μW from the baseband and counter-based scheme. During synchronization mode, the synchronization stage consumes 240 μW, but only for an average of 50 μs corresponding to one cycle of 40 kHz sampling clock. For a nominal wake-up duration of 500 μs and data packet duration of 2 ms, the duty-cycled power of synchronization stage is therefore 4.8 μW. During active mode, the backscatter IC consumes 32 μW for the fully-reflective approach and 38 μW for MIMO approach, both dominated by the power of stable clock generation to ensure low carrier frequency offset during channel frequency translation. The range limiting factors are comprehensively analyzed and a fully-reflective and a retro-reflective MIMO approaches readily supported communication ranges of 13 m and 23 m, respectively for a single AP environments.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A termination circuit for backscatter communication in an integrated wake-up receiver tag device, the termination circuit comprising:
   a first branch comprising,
      a first connection to an antenna;
      a first switch between the first connection and an open load that is connected between the first switch and ground, wherein the first switch is controlled by a first phase of an intermediate frequency signal of the tag device; and
      a second switch between the first connection and a shorted load that is connected between the second switch and ground, wherein the second switch is controlled by a second phase of the intermediate frequency signal of the tag device; and
   a second branch comprising,
      a second connection to the antenna;
      a third switch between the second connection and a capacitive load that is connected between the third switch and ground, wherein the third switch is controlled by a third phase of the intermediate frequency signal of the tag device; and
      a fourth switch between the second connection and an inductive load that is connected between the fourth switch and ground, wherein the fourth switch is controlled by a fourth phase of the intermediate frequency signal of the tag device.

2. The termination circuit of claim 1, wherein the first and second branches connect to the antenna via a power splitter combiner, wherein the first branch offset reflection coefficients are separated by a 90-degree phase shift from each other.

3. The termination circuit of claim 1, wherein the first and second branches connect to the antenna via a power splitter combiner, wherein the second branch offset reflection coefficients are separated by a 90-degree phase shift from each other.

4. The termination circuit of claim 1, wherein the first and second branch offset reflection coefficients provide four unique phase shifts.

5. The termination circuit of claim 1, wherein the wake-up receiver tag device comprises:
   a downlink Wi-Fi compatible wake-up receiver that checks for a first wake-up packet;
   a synchronization receiver enabled by the first wake-up packet, the synchronization receiver providing higher conversion gain than the wake-up receiver to detect a second wake-up packet.

6. The termination circuit of claim 5, wherein the wake-up receiver comprises a passive envelope detector that demodulates a signal, baseband signal filtering, and oversampling analog to digital converter and a packet length counter for detection of the wake-up packet.

7. The termination circuit of claim 6, wherein the wake-up receiver comprises a front-end matching network that provides passive gain to a received signal.

8. The termination circuit of claim 6, wherein the passive envelope detector comprises a passive pseudo-balun envelope detector.

9. The termination circuit of claim 6, wherein synchronization receiver comprises a low noise amplifier, an active envelope detector and an analog to digital converter.

10. The termination circuit of claim 9, comprising a wake-up enable switch from the packet length counter to enable the synchronization receiver upon detection of the first wake-up packet.

11. The termination circuit of claim 10, comprising a backscatter enable switch from the synchronization receiver to enable a backscatter modulator upon detections of the second wake-up packet.

12. The termination circuit of claim 11, wherein the backscatter modulator comprises a single side band quadrature phase shift key multiple-input-multiple-output modulator that sends tag data to an IF mixer connected to antenna switches terminated by the first branch and the second branch.

13. The termination circuit of claim 1, wherein the first branch and the second branch are always active, only one of the first and second switches are active at the same time, and only one of the third and fourth switches are active at the same time.

14. A termination circuit for backscatter communication in an integrated wake-up receiver tag device, the termination circuit comprising:
   an antenna array comprising an inner pair and an outer pair of antennae, wherein each antenna in the inner pair and the outer pair is connected between a pair of switches, wherein each pair of switches of the inner pair is driven by an in-phase and complement in-phase intermediate frequency signal of the tag device and each of the pair of switches of the outer pair is driven by quadrature phase intermediate frequency signal of the tag device; a first transmission line dimensioned to provide a first delay, the first transmission line being connected between inner switches of the pair of switches of the inner pair, wherein the inner switches of the pair of switches of the inner pair are connected to different ones of the inner pair of antennae;
   a second transmission line dimensioned to provide a second delay, the second transmission line being connected between outer switches of the pair of switches of the inner pair, wherein the outer switches of the pair of switches of the inner pair are connected to the different ones of the inner pair of antennae;
   a third transmission line dimensioned to provide a third delay, the third transmission line being connected between inner switches of the pair of switches of the outer pair, wherein the inner switches of the pair of switches of the outer pair are connected to different ones of the outer pair of antennae; and
   a fourth transmission line dimensioned to provide a fourth delay, the fourth transmission line being connected between outer switches of the pair of switches of the outer pair, wherein the outer switches of the pair of switches of the outer pair are connected to the different ones of the outer pair of antennae.

15. The termination circuit of claim 14, wherein the wake-up receiver tag device comprises:
   a downlink Wi-Fi compatible wake-up receiver that checks for a first wake-up packet;

a synchronization receiver enabled by the first wake-up packet, the synchronization receiver providing higher conversion gain than the wake-up receiver to detect a second wake-up packet.

16. The termination circuit of claim 14, wherein the wake-up receiver comprises a passive envelope detector that demodulates a signal, baseband signal filtering, and oversampling analog to digital converter and a packet length counter for detection of the wake-up packet.

17. The termination circuit of claim 16 wherein the wake-up receiver comprises a front-end matching network that provides passive gain to a received signal.

18. The termination circuit of claim 16, wherein the passive envelope detector comprises a passive pseudo-balun envelope detector.

19. The termination circuit of claim 16, wherein synchronization receiver comprises a low noise amplifier, an active envelope detector and an analog to digital converter.

20. The termination circuit of claim 16, comprising a wake-up enable switch from the packet length counter to enable the synchronization receiver upon detection of the first wake-up packet.

21. The termination circuit of claim 16, comprising a backscatter enable switch from the synchronization receiver to enable a backscatter modulator upon detections of the second wake-up packet.

22. The termination circuit of claim 21, wherein the backscatter modulator comprises a single side band quadrature phase shift key multiple-input-multiple-output modulator that sends tag data to an IF mixer connected to the switched connections.

\* \* \* \* \*